March 16, 1926.
M. J. CAFIERO
CABLE SUPPORT
Filed April 15, 1925
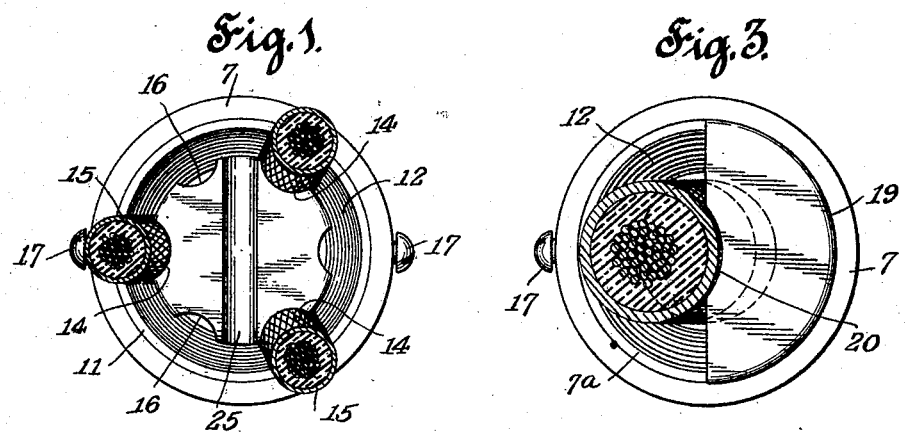
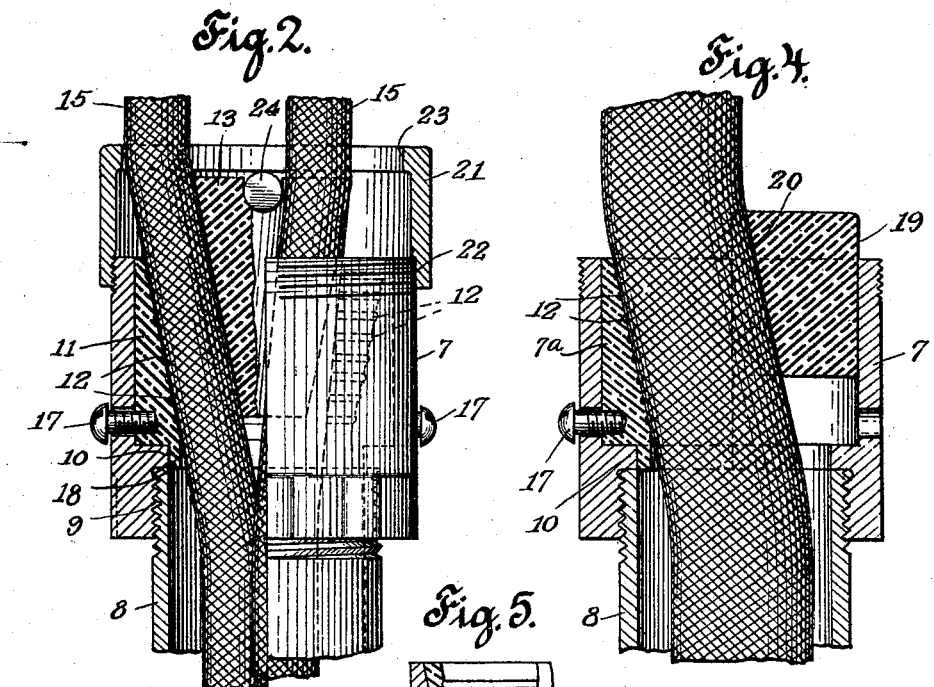
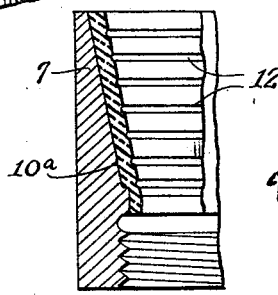
INVENTOR
Michael J. Cafiero
BY
Philip S. McLean
ATTORNEY Patented Mar. 16, 1926.

1,576,947

UNITED STATES PATENT OFFICE.

MICHAEL J. CAFIERO, OF BROOKLYN, NEW YORK.

CABLE SUPPORT.

Application filed April 15, 1925. Serial No. 23,287.

*To all whom it may concern:*

Be it known that I, MICHAEL J. CAFIERO, a citizen of the United States of America, and a resident of Brooklyn, Kings County, and State of New York, have invented certain new and useful Improvements in Cable Supports, of which the following is a specification.

The present invention relates to the supporting of vertical cables.

The objects of the invention are to provide a simple, strong, durable, easily applied support for vertical cables, which will be relatively inexpensive but practical and efficient in every way.

These objects are attained in part by a novel combination, including a sleeve or shell engageable directly on the end of the cable conduit or pipe, and insulating lining seated on a shoulder in said sleeve and having a cable supporting surface and a wedge in the lining and constructed to hold the cable or cables engaged with the supporting surface.

Other novel features of the invention will appear as the specification proceeds.

In the accompanying drawings the invention is shown embodied in practical commercial form, but it should be understood that the structure may be varied without departure from the broad spirit and scope of the invention as hereinafter defined and claimed.

Figure 1 is a top plan view of the holder arranged for supporting three cables.

Figure 2 is a part sectional elevation of the holder.

Figure 3 is a plan view of the holder arranged for supporting a single cable.

Figure 4 is a vertical sectional view of the same.

Figure 5 is a fragmentary sectional view of a modification.

The body of the device consists of a sleeve 7 preferably of malleable iron or steel so that it may be in the form of a relatively light shell and yet be capable of confining and sustaining the weight of the cable or cables.

This sleeve or shell is adapted to be mounted directly upon the upper end of the pipe or conduit 8 and for that reason is shown as having an internally screw threaded lower end at 9 for engagement with the threaded end of the pipe.

Within the sleeve a supporting shoulder is provided, the same being shown in the first four views as an inwardly extending annular flange or shelf 10, located near the lower end of the sleeve in position to act as a stop engaging the end of the pipe when the sleeve is screwed in place thereon.

Enclosed within the shell and supported upon the annular shoulder is a collar 11 of insulating material having a downwardly and inwardly inclined surface for supporting the cable or cables, which may be corrugated or otherwise roughened to provide a cable gripping and supporting surface, as indicated at 12.

Cooperating with the cable gripping and supporting surface of the liner to form the cable clamp, there is shown a tapered wedge 13. In the case where two or more cables are to be supported in the one holder, this wedge is provided with grooves in the peripheral portion of the same to receive the cables. In the illustration this wedge is shown as having three equidistantly spaced grooves 14 for holding three fairly large cables 15 and between these large size grooves a set of smaller grooves 16 for engagement with correspondingly smaller cables. This permits the use of the same wedge with cables of different diameter or with holders or linings of different size.

The insulating lining is shown as held in place in the supporting sleeve by screws 17 entered into the lower thickened portion of the lining through the sides of the sleeve, but it will be evident that the sleeve may be retained in place in other ways as by forcing it with a drive fit into the sleeve or by displacing portions of the metal at the upper inner edge of the sleeve over the top of the liner, the malleable character of the metal permitting of such fastening.

The lower portion of the sleeve is shown as extending inward beyond the inner edge of the supporting shoulder so that the cable would naturally be held by the liner out of contact with the shoulder but as an additional precaution, said lining is indicated as having a dependent lip 18 covering the edge of the shoulder.

Where only a single cable is to be supported as in Figures 3 and 4, only half the liner is needed for the support of the cable as indicated at 7ª and the wedge then may be made with a cylindrical rear surface 19 to cooperate directly with the unlined semi-cylindrical portion of the shell, the forward or engaging portion of the wedge having as before, a cable receiving groove 20 inclined in accord with the incline of the lining. This single cable support is used in the same way as the multiple cable support, by driving down the wedge until a firm grip upon the cable is secured, the downward drag of the cable or cables locking the wedge in this holding position.

Instead of being so abrupt, as shown in Figures 2 and 4, the supporting shoulder may be sloping or shelving on a more or less gradual incline as indicated at 10ª in Figure 5, and the insulating liner 11ª be of conical shape inside and out. With this construction it is possible to make the lining of sheet material. In the first form the lining may be cut from tubing of suitable insulating material and the cut sections machined to give them the proper inside taper and gripping surface.

In all forms the construction is relatively light and small in size, the holder in effect being of no greater diameter than would be a coupling on the pipe. The insulating lining need not be made very heavy as it is entirely surrounded by the shell which reinforces and prevents it from splitting and at the same time forms a protective housing.

If desired, the wedge may be locked in gripping engagement with the cable as by means of an annular screw ring 21 having a screw engagement with the top of the housing sleeve at 22 and provided with an inturned flange 23 bearing down on a cross bar 24 engaged with the top of the wedge. This cross bar may be seated in a groove 25 to prevent it from twisting into engagement with the cable or cables. It will be evident that by turning down this ring the wedge will be forced into firm gripping engagement with the cable so this ring may be utilized therefore as a means both for forcing the wedge to and securing the same in cable holding position.

By using malleable metal or equivalent, the shell can be relatively thin so as to be small in size, light in weight and inexpensive, and because of the strength in this shell, the insulating lining can be quite thin and therefore of low cost, a tough hard insulating material being used which in itself is possessd of considerable strength, the confinement of the same in the shell preventing it from splitting and enabling it to carry the heavy load to which it is subjected.

What is claimed is:

1. A vertical cable support comprising a thin metallic one piece shell internally screw threaded at its lower end for engagement directly on the upper end of a cable conduit and provided at the upper end of such screw threaded portion with an internal annular shoulder, a thin lining of hard tough insulating material seated in said shell, supported on top of said annular shoulder and tubular for the continuous passage of cable therethrough, said lining being confined against spreading by the surrounding wall of the sleeve and provided on its inner face with a downwardly inclined cable supporting surface and a wedge having a correspondingly inclined cable gripping surface opposed to the inclined surface of the lining for clamping a cable in supported engagement with said surface.

2. A vertical cable support comprising a thin metallic one piece shell provided with means for mounting the same direct on the upper end of a cable conduit and provided with an internal annular shoulder, a thin lining of hard tough insulating material seated in said shell, supported on said annular shoulder, said lining being confined against spreading by the surrounding wall of the sleeve and provided with an inwardly facing inclined cable supporting surface and a wedge having a correspondingly inclined cable gripping surface opposed to the inclined surface of the lining for clamping a cable in supported engagement with said surface, the lining being provided with a dependent lip extending down over the innermost portion of the supporting shoulder and means for rigidly securing the lining in position on the shoulder with said lip extending downwardly thereover.

3. A vertical cable support comprising a thin metallic one piece shell provided with a seat in the lower end of the same for engagement directly over the upper end of a cable conduit and provided with an internal annular shoulder at the upper end of such seat, a thin tubular lining of hard tough insulating material seated in said shell and supported on said annular shoulder, said lining being confined against spreading by the surrounding wall of the sleeve and provided on its inner face with a downwardly inclined cable supporting surface and a wedge having a correspondingly inclined cable gripping surface opposed to the inclined surface of the lining for clamping a cable in supported engagement with said surface.

4. The structure of claim 3 with means connected with and carried by the shell for adjustably forcing the wedge down into the lining and into firm gripping engagement with the cable or cables dependent from the lining.

5. The structure of claim 3 with an open center securing ring screw threaded on the upper end of the shell and having an inwardly extending flange and a bar bearing on the wedge and engaged at its ends by said flange of the screw ring.

6. A vertical cable support comprising a shell for mounting on a cable conduit, a tubular insulating lining in said shell provided with an inclined cable supporting surface, a wedge for clamping a cable in engagement with said inclined cable supporting surface and means on the shell for forcing said wedge down into firm gripping engagement with a cable dependent from the inclined supporting surface of the insulating lining.

7. A vertical cable support comprising a shell for mounting on a cable conduit, a tubular insulating lining in said shell provided with an inclined cable supporting surface, a wedge for clamping a cable in engagement with said inclined cable supporting surface and means on the shell for forcing and holding said wedge down into firm gripping engagement with a cable dependent from said cable supporting surface, including a ring screw threaded on the upper end of the shell and having an inwardly extending flange and a cross bar engaged at its ends by said ring and bearing with its intermediate portion on the wedge.

8. A vertical cable support comprising a shell provided with means at its lower end for enabling the mounting of the same directly on the upper end of a cable conduit and provided with means at its upper end for enabling the engagement of a tubular member therewith, a lining of hard tough insulating material seated in said shell and provided with an inwardly facing inclined cable supporting surface and a wedge having a correspondingly inclined cable gripping surface opposed to the inclined surface of the lining for clamping a cable in supported engagement with said surface and a tubular member applied to the upper end of the shell and enclosing said wedge.

In witness whereof, I have hereunto set my hand this 13th day of April, 1925.

MICHAEL J. CAFIERO.